United States Patent
Greene

(10) Patent No.: US 6,676,088 B1
(45) Date of Patent: Jan. 13, 2004

(54) FLARE CONTROL SYSTEM

(75) Inventor: Leonard M. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 0 days.

(21) Appl. No.: 10/265,366

(22) Filed: Oct. 7, 2002

(51) Int. Cl.$^7$ ................................ G05D 1/12
(52) U.S. Cl. ................................ 244/187
(58) Field of Search ................ 244/187, 185, 244/186, 189, 194

(56) References Cited

U.S. PATENT DOCUMENTS

| | | | | |
|---|---|---|---|---|
| 3,052,427 A | * | 9/1962 | Match et al. | 244/187 |
| 3,115,319 A | * | 12/1963 | Glaser et al. | 244/187 |
| 3,266,039 A | * | 8/1966 | Sylvander | 342/408 |
| 3,266,040 A | * | 8/1966 | Doniger | 342/408 |
| 3,604,908 A | * | 9/1971 | Loome et al. | 701/18 |
| 3,801,049 A | * | 4/1974 | Simpson et al. | 244/187 |
| 3,892,373 A | * | 7/1975 | Doniger | 244/186 |
| 4,354,237 A | * | 10/1982 | Lambregts et al. | 701/16 |
| 4,419,732 A | * | 12/1983 | Lambregts et al. | 701/16 |
| 4,536,843 A | * | 8/1985 | Lambregts | 701/3 |
| 5,170,163 A | * | 12/1992 | Collins et al. | 340/967 |
| 6,186,447 B1 | * | 2/2001 | Virdee | 244/188 |
| 6,575,410 B2 | * | 6/2003 | Greene | 244/186 |

* cited by examiner

*Primary Examiner*—Charles T. Jordan
*Assistant Examiner*—Stephen A Holzen
(74) *Attorney, Agent, or Firm*—Dennison, Schultz & Dougherty

(57) ABSTRACT

An aircraft flare control system for semi-automatically controlling the pitch and thrust of an aircraft during landing is disclosed. The system includes a flight director and indication of the pitch angle of an aircraft during a landing maneuver and a flare computer. The flare computer includes a control law defining a predetermined pitch angle of the aircraft as a function of height above ground level. The system also includes a radio altimeter connected to the flare computer for producing a signal indicative of the height of the aircraft, a signal of pitch deviation from the control law is generated to allow a pilot or auto-control to adjust the pitch to comply with the control law. A thrust control for retarding the throttle as a function of altitude above ground level is also provided.

9 Claims, 2 Drawing Sheets

FLARE CONTROL SYSTEM

FIELD OF THE INVENTION

This invention relates to an airborne flare control system and more particularly to an airborne flare control system for providing a near asymptotic approach to touchdown.

BACKGROUND FOR THE INVENTION

The need for a highly reliable and safe automatic or semi-automatic landing system for aircraft has been recognized. It has also been recognized that any such systems should be fully operable under adverse weather conditions with reliability. Such systems must automatically or semi-automatically land an aircraft safely in fog or rain, at night, with heavy payloads and produce a smooth near asymptotic landing under any such conditions.

In order to meet the requirements for reliability and to provide for smooth landings under adverse conditions, an automatic or semi-automatic landing system must contain control equipment which is insensitive to outside disturbances normally encountered in landings. Such systems must also be reliable, durable, reasonably easy to install and to operate with minimum maintenance.

In the past, various control systems have been used to control aircraft in flight. For example, glide slope systems have been used to guide an aircraft down to a flare altitude of about 50 feet. However, at flare altitude, other means of control are provided to alter the aircraft's flight path and achieve a touchdown at a much reduced rate of descent.

One system for automatically landing an aircraft is disclosed in U.S. Pat. No. 3,031,662 of Bond. In that system, a flare path is provided which accurately controls the rate of descent of the aircraft in proportion to the altitude. If the rate of descent of an aircraft is controlled in proportion to altitude, an exponential flare may be obtained which provides the necessary flare path to meet the design requirements.

In one embodiment of the Bond system, the altitude and altitude rate signals are obtained from a radio altimeter and the acceleration signal is obtained from a vertical accelerometer. The three signals are then combined to provide an indication to an automatic control system of the relation of the actual landing path described by the aircraft to the theoretical curve described by an altitude equation.

Notwithstanding past developments and the need for reliable automatic landing systems, such systems have not enjoyed widespread commercial success. It is believed that such systems fail to provide the needed flexibility, reliability and rapid response time to accommodate rough air, head and tail wind oscillations and other related problems.

It is now believed that there may be a commercial demand for an improved flare control system for landing an aircraft in accordance with the present invention. Such systems will provide a near asymptotic approach to touchdown and control the curvilinear flight path for the final 30 feet of descent. It is believed that there is a demand for a system and method which controls two parameters of importance, i.e. the pitch and thrust of the aircraft. Such systems must maintain certain minimum airspeed and at the same time provide sufficient lift to avoid hard landings and to prevent the aircraft from stalling.

In addition, the accuracy of the systems in accordance with the present invention provide enhanced landing performance on all landings including those made under adverse conditions. Adverse conditions include times when a runway is reflective, such as dark wet surfaces and patches of scud. Seaplane pilots are familiar with similar difficulties encountered in landing on glassy water and recognize that glassy water is one of the primary causes of landing accidents.

The systems in accordance with the present invention can be used on every landing with reliability. Further, such systems do not add any additional weight to an auto throttle computer and have been tested on the assignee's aircraft regardless of whether and with good results. Also, the system provides auto throttle closure whenever the speed is above the altitude relationship or in case of head wind sheer. Further, the auto throttle closure will cease whenever the airplane is under the altitude/target speed or in the case of tail wind sheer and eliminates excessive floating before touchdown and hard landings.

BRIEF SUMMARY OF THE INVENTION

In essence, the present invention contemplates a flare control system for providing a near asymptotic approach to touchdown by controlling the pitch and thrust of the aircraft at preselected altitudes above ground level. The system comprises a conventional flight director and conventional means for indicating the pitch angle of an aircraft during a landing maneuver and for displaying an indication of the pitch angle on a flight director. The system also includes a flare computer including a control law inputted into the computer. The control law defines a baseline pitch angle of the aircraft established in the last phases of flight which is modified as a function of height above ground level. A radio altimeter is operatively connected to the flare computer for producing a signal indicative of the height of the aircraft. Means including the flare computer generate a signal indicative of the pitch deviation from the control law to allow a pilot or auto-control to adjust the pitch to comply with the control law. Thrust control means for a pilot or auto control to retard the throttles as a function of altitude above ground level is also provided.

The computation inputs utilized by the present system include, glide path memory, airspeed, reference speed, radio altitude, rate of descent and air speed vs. altitude program.

The invention will now be described in connection with the accompanying drawings.

DESCRIPTION OF THE PREFERRED EMBODIMENT OF THE INVENTION

In a conventional approach to landing, a pilot receives signals from the instrument landing system (ILS) to manually or automatically (coupled with an auto-pilot) control the flight path of the aircraft. This requires a combination of pitch and thrust control. The aircraft follows a guide slope beam to the runway in a straight line path, and if continued to touchdown would make violent contact with the runway. In order to avoid this violent contact, the aircraft must be "flared" just prior to landing resulting in a near asymptotic approach to touchdown.

A flare control system in accordance with the present invention utilizes a control law on the pitch command bars of an aircraft's flight director. The system allows a pilot to follow the control beam during the approach to landing, particularly during the flare maneuver to provide a near asymptotic approach to a touchdown. The system also maintains precise control of the aircraft's thrust.

There are three major factors involved in making successful smooth repeatable landings. The factors are:

1. Control of the aircraft, both speed and glide path from an outer marker to the landing area. This factor typically uses a standard ILS approach to a minimum altitude.

2. Maintain the aircraft on the glide path below the minimum decision height using a conventional auto-throttle to maintain speed and the flight director to maintain pitch using the control law of the invention.

3. From the flare initiation altitude ($h_1$) to touchdown, the flare maneuver uses the control law of the invention and automatic throttle closure to provide a near asymptotic approach to touchdown.

As contemplated by the invention, the flare control to touch down guidance system is incorporated in an aircraft as an addition to the aircraft's auto throttle computer. Its purpose is to present the entire flare and touch down in a flight director. In addition, the accuracy standard of the system is based on the flare being a section of a vertical circle from 30 feet to touch down with a flare time of 9 to 10 seconds, a touch down speed of Ref. −5 knots and the touch down rate of descent of less than 1 foot per second.

One embodiment of the invention also contemplates a different division of the workload in the cockpit. For example, the landing pilot will focus on the flight director and adjacent instruments. At the same time, the heads up pilot will observe the progress of the landing and will be in command of the aircraft at all times. This approach allows each pilot to concentrate on their assigned tasks. Further, the FAR requirements are met because the "heads up" or visual pilot is in command.

Figure 1:
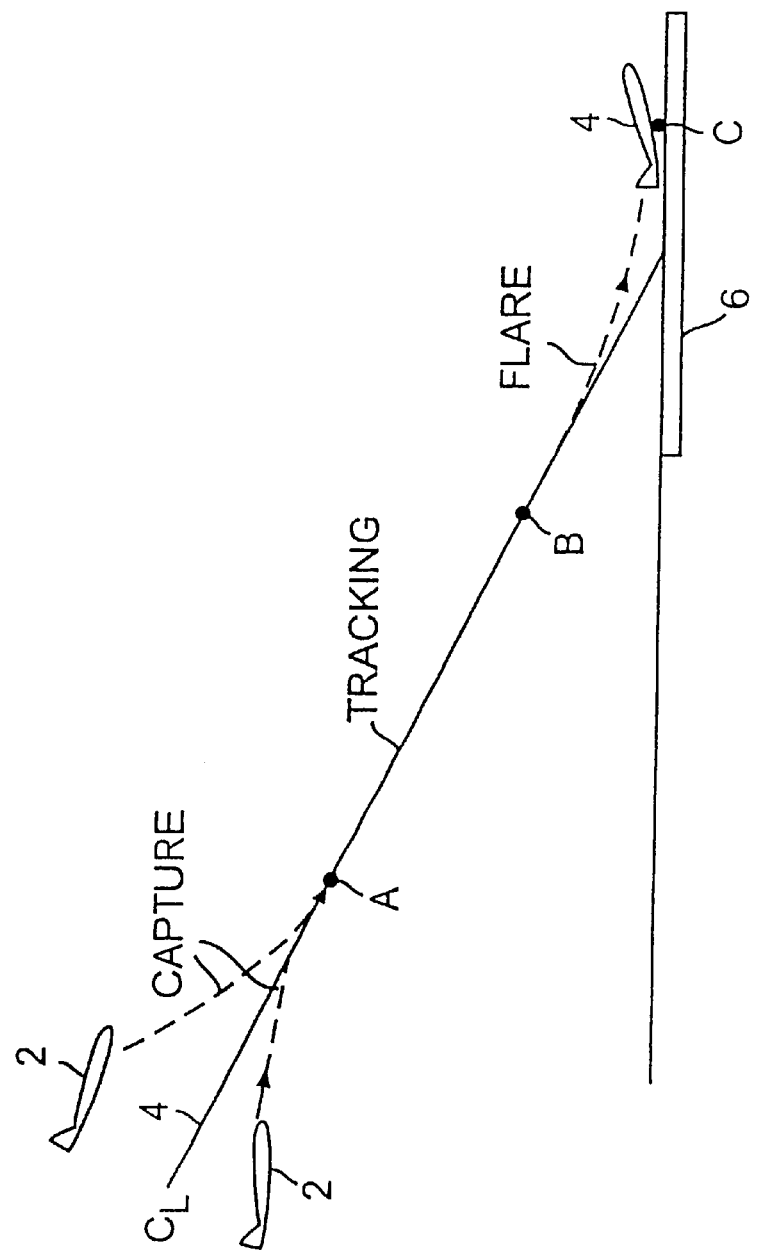
FIG. 1 is a diagrammatic representation showing a typical glide path, capture and flare maneuver as an aircraft approaches and lands at an airport.

As illustrated in FIG. 1, an aircraft 2 is controlled by conventional means to capture an ILS glide path signal or center line 4 as for example disclosed in the U.S. Pat. No. 3,892,373 of Doniger which is incorporated herein in its entirety by reference. At a point A from either level flight below the center line 4 or from a descending flight above the center line 4, the aircraft 2 tracks the beam or center line 4 from point A to point B. At point B, the flare maneuver is initiated and controls the aircraft to touchdown at point C.

In a system in accordance with the present invention, an aircraft is equipped with conventional flight condition sensors suitably mounted aboard the aircraft. For example, the aircraft is equipped to capture an ILS glide path beam center line as well as an indication of glide slope error or glide slope deviation 18. A glide slope deviation signal is then sent to a flight director 30 via a switch 19 in a conventional manner.

During a landing approach, when the aircraft is above a minimum decision height, the flight director or pitch command is controlled by a glide slope deviation signal from the aircraft's NAV system. The minimum decision height is determined by the pilot and inputted into a computer in a conventional manner based on type of aircraft, airport, etc. For example, a minimum decision height (MDH in FIG. 2) may be selected by the pilot. Then when the aircraft descends below the minimum decision height, the flight director pitch command is controlled by the invention (the flare signal).

Figure 2:
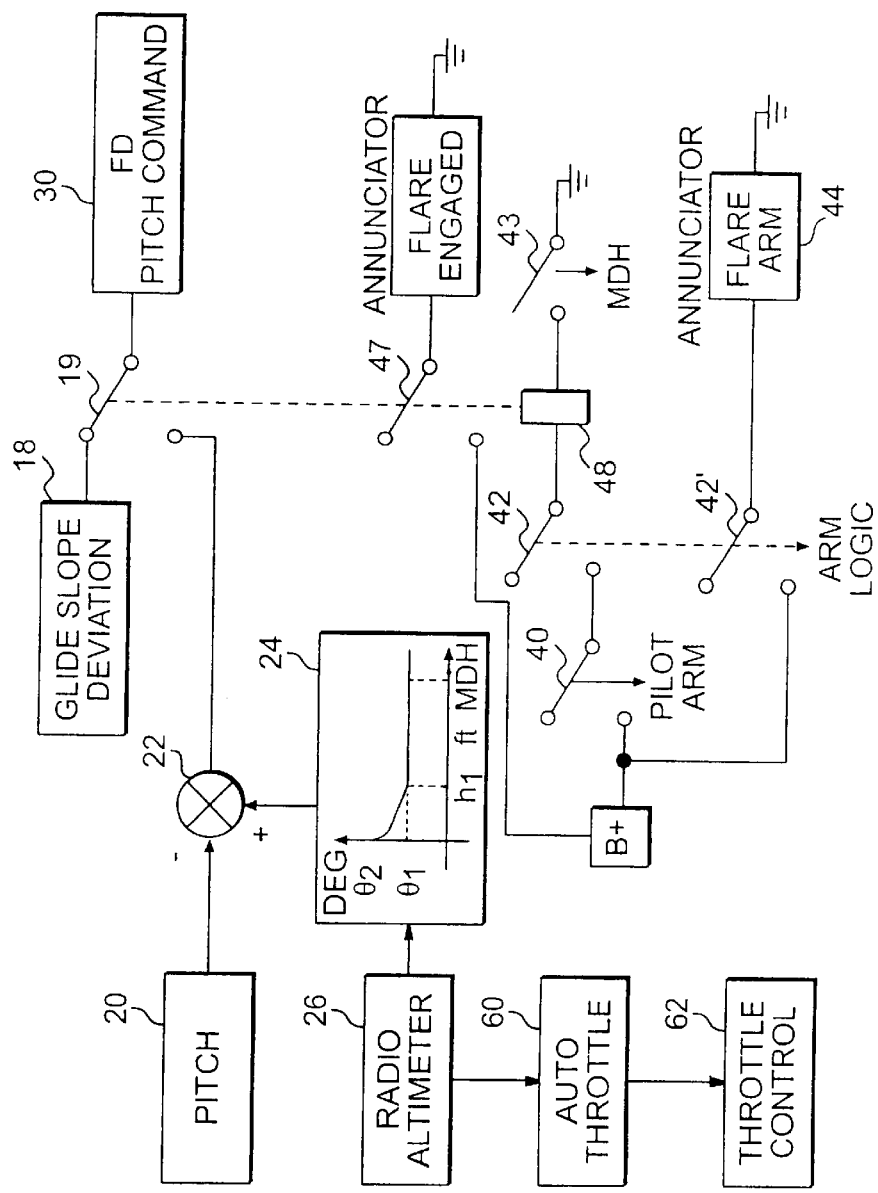
FIG. 2 is a block diagram which illustrates a preferred embodiment of the invention.

Referring now to FIG. 2, prior to the minimum decision height, the pilot arms the system by closing the switch 40 which is connected to a voltage source B+. Then, assuming that the arm logic is satisfied, i.e. an auto-throttle system energized, gear down and approach flaps in place, the switches 42 and 42' are closed. During the last phase of the approach the invention establishes a baseline based on the glide slope. A switch 43 is automatically closed at the minimum decision height in a conventional manner so that a relay 48 moves the switch 19 from the glide slope deviation control to the flare control system. The relay 48 also closes a switch 47 to actuate a flare engaged enunciator 53 by connection to the voltage source B+.

With the flare control system engaged, a conventional pitch system 20 produces a signal indicative of the aircraft's pitch and feeds the signal to a summing junction 22. The flare control system also includes a flare computer 24 which includes a control law for defining a predetermined pitch angle ($\theta_1$) from the established baseline of the aircraft.

The radio altimeter 26 feeds a signal indicative of the aircraft's height to the flare computer 24 which generates a signal indicative of the proper pitch angle of the aircraft at its altitude above ground level. The summing junction 22 subtracts the aircraft's pitch from a $\theta_1$ pitch bias for altitudes greater than $h_1$ above ground level. This causes the flight director pitch command bars to command a $\theta_1$ pitch-up angle. Then as the altitude decreases below $h_1$ above ground level, the flight director pitch command is modified from the baseline pitch target as a function of altitude to $\theta_2$ at touchdown. This pitch rotation, along with the throttle's retarding (power reduction), reduces the horizontal air speed. It also reduces the vertical speed to about 1 foot per second at touchdown resulting in a near asymptotic approach to touchdown. The signal from the summing junction 22 to the pitch command bars of the flight director is controlled by the switches 40, 42, 43, 19 and relay 48.

In practice, when the flare control system is armed, the aircraft is maintained on the glide slope below the minimum decision height by an auto-throttle 60 and throttle control 62 to maintain speed and the flight director is used to maintain pitch. The auto-throttle 60 may be an auto-power system model CSL 604 manufactured by Safe Flight Instrument Corporation of White Plains, N.Y. or other conventional auto-throttle systems. An auto-throttle system such as an Airborne Safe Landing Power Control System as disclosed in my copending U.S. patent application Ser. No. 09/467,072 filed on Dec. 20, 1999 may also be used. That application which is assigned to the same assignee of the present invention and is incorporated herein in its entirety by reference.

While the invention has been described in connection with its preferred embodiment, it should be recognized and understood that changes and modifications may be made therein without departing from the scope of the appended claims.

What is claimed is:

1. An aircraft flare control system for providing a near asymptotic approach to touchdown by controlling the pitch and thrust of the aircraft at preselected altitudes above ground level, said system comprises a flight director, means for indicating the pitch angle of an aircraft during a landing maneuver and a flare computer including a control law defining a baseline pitch angle of the aircraft established in the last phases of flight which is modified as a function of height above ground level and a radio altimeter operably connected to said flare computer for producing a signal indicative of the height of the aircraft, means for generating a signal indicative of pitch deviation from said control law to allow a pilot or auto-control to adjust the pitch to comply with said control law and thrust control means for pilot or auto control to retard the throttles as a function of altitude above ground level.

2. An aircraft flare control system according to claim 1 in which said means for generating a signal indicative of pitch deviation from said control law includes a summing junction.

3. An aircraft flare control system according to claim 2 in which said signal indicative of pitch deviation from said control law is displayed on said flight director.

4. An aircraft flare control system according to claim 2 which includes means for arming the system at a minimum decision altitude.

5. An aircraft flare control system according to claim 2 which includes means for producing a signal indicative of glide slope error.

6. An aircraft flare control system according to claim 2 which includes means for warning a pilot that the flare control system is armed.

7. An aircraft flare control system according to claim 2 which includes an annunciator for indicating that the flare system is engaged.

8. A method of aircraft flare control for providing a near asymptotic approach to touch down by controlling the pitch and thrust of the aircraft at preselected altitudes above ground level comprising the steps of:

providing an angle of attach indicator, flight director and a flare computer including a control law defining a baseline pitch angle of the aircraft in the last phases of flight which is modified as a function of height above ground level and a radio altimeter operably connected to the flare computer for producing a signal indicative of the height of the aircraft, a pitch deviation indicator for indicating the pitch deviation from the control law and a throttle control;

adjusting the pitch to comply with the control law; and retarding the throttle as a function of altitude above ground level.

9. A method of aircraft flare control for providing a near asymptotic approach to touch down according to claim 8 in which a first or landing pilot focuses on the flight director flare and adjacent instruments during landing and in which a second or heads up pilot observes the progress of the landing and is in control of the aircraft at all times during the landing maneuver.

* * * * *